US010474357B2

(12) United States Patent
Bouaziz

(10) Patent No.: US 10,474,357 B2
(45) Date of Patent: Nov. 12, 2019

(54) TOUCH SENSING DISPLAY DEVICE AND METHOD OF DETECTING USER INPUT FROM A DRIVER SIDE OR PASSENGER SIDE IN A MOTOR VEHICLE

(71) Applicant: AUDI AG, Ingolstadt (DE)

(72) Inventor: Tahar Bouaziz, Ingolstadt (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 15/769,284

(22) PCT Filed: Jan. 18, 2017

(86) PCT No.: PCT/EP2017/050916
§ 371 (c)(1),
(2) Date: Apr. 18, 2018

(87) PCT Pub. No.: WO2017/133890
PCT Pub. Date: Aug. 10, 2017

(65) Prior Publication Data
US 2018/0314420 A1 Nov. 1, 2018

(30) Foreign Application Priority Data

Feb. 5, 2016 (DE) .................. 10 2016 001 314

(51) Int. Cl.
G06F 3/0488 (2013.01)
B60K 37/06 (2006.01)

(52) U.S. Cl.
CPC .......... *G06F 3/04886* (2013.01); *B60K 37/06* (2013.01); *B60K 2370/146* (2019.05);
(Continued)

(58) Field of Classification Search
CPC ...... G06F 3/0416; G06F 3/041; G06F 3/0488; G01C 21/3461; B60K 35/00
See application file for complete search history.

(56) References Cited

U.S. PATENT DOCUMENTS

2006/0028453 A1* 2/2006 Kawabe .................. G06F 3/041
345/173
2008/0186282 A1* 8/2008 Nix .......................... B60K 37/00
345/173
(Continued)

FOREIGN PATENT DOCUMENTS

CN 103517822 1/2014
CN 104943544 9/2015
(Continued)

OTHER PUBLICATIONS

German Office Action dated Jun. 28, 2017 from German Patent Application No. 10 2016 001 314.1, 12 pages.
(Continued)

*Primary Examiner* — Jennifer Mehmood
*Assistant Examiner* — James S Nokham
(74) *Attorney, Agent, or Firm* — Staas & Halsey LLP

(57) ABSTRACT

A touch-sensitive display apparatus and a control apparatus are included in an operating device of a motor vehicle. The control apparatus is configured, in a first operating mode, to display on the display apparatus a screen keyboard for receiving a character sequence from a user. A driver is not to operate the on-screen keyboard during a journey. A sensor apparatus is configured to detect an approach of an object to the display apparatus, a distinction being drawn between a driver approach from a predetermined driver side and a passenger approach from a passenger side opposite the driver side. The control apparatus is configured to deactivate the first operating mode in the event of a detected driver approach of the object and, instead, to activate an alternative operating mode that is different from the first operating mode.

20 Claims, 1 Drawing Sheet

(52) U.S. Cl.
CPC .............. *B60K 2370/148* (2019.05); *B60K 2370/1438* (2019.05); *B60K 2370/195* (2019.05); *B60K 2370/31* (2019.05); *B60K 2370/52* (2019.05); *B60K 2370/736* (2019.05); *B60K 2370/739* (2019.05)

(56) References Cited

U.S. PATENT DOCUMENTS

| | | | |
|---|---|---|---|
| 2008/0192024 A1* | 8/2008 | Mita | G06F 3/044 345/173 |
| 2009/0167682 A1 | 7/2009 | Yamashita et al. | |
| 2009/0273575 A1* | 11/2009 | Pryor | B60K 35/00 345/173 |
| 2010/0252244 A1* | 10/2010 | Ninagawa | B23K 1/0012 165/177 |
| 2011/0285657 A1* | 11/2011 | Shimotani | G06F 3/0416 345/173 |
| 2013/0096771 A1 | 4/2013 | Srenger | |
| 2013/0106995 A1 | 5/2013 | Jeon et al. | |
| 2014/0062858 A1 | 3/2014 | Yasumoto | |
| 2015/0051780 A1* | 2/2015 | Hahne | B60W 30/09 701/23 |
| 2015/0131857 A1 | 5/2015 | Han et al. | |
| 2015/0268746 A1* | 9/2015 | Cuddihy | G06F 3/041 345/173 |
| 2016/0110148 A1 | 4/2016 | Egle et al. | |
| 2016/0195989 A1* | 7/2016 | Czelnik | G06F 3/0488 345/174 |
| 2017/0067750 A1* | 3/2017 | Day | G01C 21/3461 |

FOREIGN PATENT DOCUMENTS

| | | | |
|---|---|---|---|
| CN | 105163974 | | 12/2015 |
| CN | 106103177 | | 11/2016 |
| DE | 102 49 686 | A1 | 5/2004 |
| DE | 103 40 249 | A1 | 4/2005 |
| DE | 103 49 673 | | 5/2005 |
| DE | 10 2009 021 124 | A1 | 9/2010 |
| DE | 10 2009 018 681 | A1 | 10/2010 |
| DE | 10 2012 014 074 | A1 | 1/2014 |
| DE | 10 2014 204 800 | A1 | 9/2015 |
| DE | 10 2016 001 314 | | 2/2016 |
| DE | PCT/EP2017/050916 | | 1/2017 |
| WO | 2004/022388 | A1 | 3/2004 |
| WO | WO-2015082202 | A1 * | 6/2015 ............ B60K 35/00 |
| WO | PCT/EP2017/050916 | | 1/2017 |

OTHER PUBLICATIONS

German Office Action dated Jan. 31, 2017 from German Patent Application No. 10 2016 001 314.1, 8 pages.
International Search Report dated May 16, 2017 from International Patent Application No. PCT/EP2017/050916, 2 pages.
International Preliminary Report on Patentability dated Jan. 31, 2018, from International Patent Application No. PCT/EP2017/050916, 7 pages.
English translation of International Preliminary Report on Patentability dated Jan. 31, 2018, from International Patent Application No. PCT/EP2017/050916, 8 pages.
Chinese Office Action dated Nov. 8, 2018 from Chinese Patent Application No. 201780003918.3, with English language translation of summary of Examiner's comments, 10 pages total.

\* cited by examiner

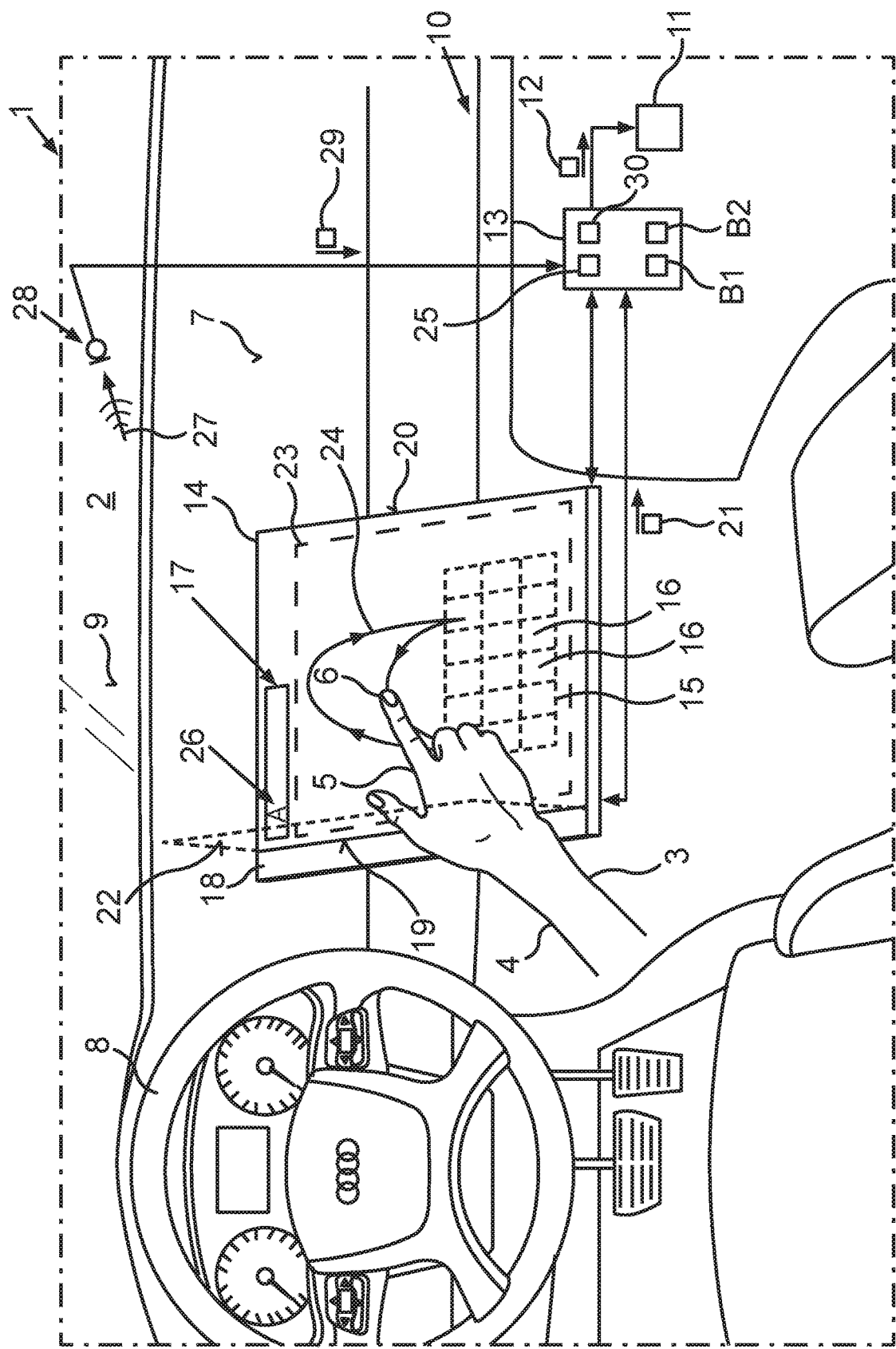

TOUCH SENSING DISPLAY DEVICE AND METHOD OF DETECTING USER INPUT FROM A DRIVER SIDE OR PASSENGER SIDE IN A MOTOR VEHICLE

CROSS REFERENCE TO RELATED APPLICATIONS

This application is a U.S. national stage of International Application No. PCT/EP2017/050916, filed on Jan. 18, 2017. The International Application claims the priority benefit of German Application No. 10 2016 001 314.1 filed on Feb. 5, 2016. Both the International Application and the German Application are incorporated by reference herein in their entirety.

BACKGROUND

Described herein is an operating device for a motor vehicle. The operating device includes a touch-sensitive display apparatus, that is to say a touchscreen, and a control apparatus for receiving a character sequence from a user via a screen keyboard which is displayed on the display apparatus. Also described herein is a motor vehicle which has the operating device. Finally, also described herein is a method for receiving a character sequence from a user by using an operating device in a motor vehicle.

Inputting a character sequence by using a screen keyboard is an efficient way of inputting a character sequence in a motor vehicle in order to stipulate a navigation destination, for example. However, the operation of a screen keyboard also requires such a high degree of attentiveness that it is not desirable for a keyboard to be used by a driver during a journey of the motor vehicle. However, there is also no desire to dispense with the screen keyboard since the character sequence can also be input by a passenger, for example.

In connection with the distinction between a driver and a passenger, U.S. Patent Application Publication 2013/0096771 A1 describes an operating device that receives voice commands and decides, on the basis of voice recognition, whether the voice command is spoken by a driver or a passenger. If the driver speaks the voice command, further operating steps are blocked so that the driver's attention is not distracted from his driving task. However, this requires the driver to speak so that he can be recognized.

German Patent Application Publication 102 49 686 A1 describes an operating device for a motor vehicle which blocks particular functions during a journey of the motor vehicle if the latter is running faster than a speed limit value. Therefore, these functions cannot be used by the driver during the journey. In order to make it possible for a passenger to use the functions, a release button is arranged on the passenger side in such a manner that this button can be reached only by the passenger. The passenger can therefore release the blocked functions by actuating the button. However, this requires additional circuitry in the motor vehicle.

German Patent Application Publication 10 2012 014 074 A1 describes the practice of operating a vehicle function via a portable terminal, the position of which in the passenger compartment is monitored. Depending on the position of the terminal, some functions are blocked in this case, with the result that a driver cannot operate the terminal from his seated position. However, this solution cannot be used for operating devices permanently installed in the motor vehicle.

SUMMARY

Described herein is configuring the operation of an operating device by a driver in a manner appropriate to the driving situation in a motor vehicle.

Described herein is an operating device for a motor vehicle. In the manner described, the operating device has a touch-sensitive display apparatus, that is to say a touchscreen for example, and a control apparatus. The control apparatus is set up, in a predetermined operating mode, to display a screen keyboard for receiving a character sequence from a user on the display apparatus. It is therefore possible for the user to efficiently input a character sequence using the screen keyboard. However, in the manner described, it is desirable to prevent the driver from doing this while driving the motor vehicle. For this purpose, a sensor apparatus is provided and is set up to detect when an object approaches the display apparatus. The sensor apparatus therefore detects, for example, whether a finger or a hand is approaching the display apparatus as the object. In this case, a distinction is made between a driver-side approach from a predetermined driver's side and a passenger-side approach from a passenger side opposite the driver's side. The sensor apparatus therefore signals whether the object is approaching from the driver's side or the passenger side. This can also be achieved by signaling the approach only if it is made from the driver's side. The control apparatus is set up to deactivate the operating mode when a driver-side approach of the object is detected and instead to activate an alternative operating mode which differs from the operating mode. If the object, that is to say for example an article, for example an operating pen, or a hand or a finger, therefore approaches from the driver's side, the operating mode with the screen keyboard is deactivated. In contrast, in the event of approach from the passenger side, the first operating mode remains enabled or active.

The operating device results in the advantage that a screen keyboard can be provided on the display apparatus, which screen keyboard is available and/or remains available for use from the passenger side even when an approach is made from there with an object. In contrast, the operating mode with its screen keyboard is deactivated if an attempt is made to approach the display apparatus and therefore the screen keyboard from the driver's side. Therefore, the screen keyboard is not available to the driver, with the result that the driver will also not envisage its use.

The sensor apparatus can be implemented, for example, on the basis of a camera which captures the movement of vehicle occupants. An image evaluation unit can then recognize the arm movements or hand movements of the vehicle occupants, for example, on the basis of the camera images. Additionally or alternatively, a sensor unit may be implemented, for example at a driver-side edge of the display apparatus, for example on the basis of at least one proximity sensor and/or infrared sensor which respectively detects or senses when an object approaches from the driver's side.

With respect to the alternative operating mode, provision may be made for the input of a character sequence to be completely blocked, for example. In other words, the screen keyboard is therefore deactivated and no operating alternative is offered. The driver therefore cannot use the corresponding functionality of the operating device for which the character sequence is intended. However, provision is, for example, made for the alternative operating mode to be set up to receive the character sequence from the driver without the screen keyboard. A true input alternative is therefore provided.

One development therefore provides for the alternative operating mode to provide a handwritten input for a driver of the motor vehicle instead of the screen keyboard. For this purpose, the control apparatus is set up to capture a character trace on the touch-sensitive display apparatus using the latter. The driver can then advantageously input or draw the characters in the character sequences on the display apparatus as a character trace using a finger or generally using the object, for example. This has the advantage that the movement is guided or supported by touching the display apparatus. Alternatively or additionally, provision may be made for a hand movement and/or a finger movement, which is freely carried out by the driver in space in a contactless manner, to be captured as the character trace using a camera. This results in the advantage that the driver can continuously keep his gaze directed at the road traffic and can freely draw the characters to be input in succession in the air only using his finger or his hand after he has approached the operating device from the driver's side. This writing in the air does not require a visual check by the driver.

Instead of the screen keyboard, one development also provides touch-sensitive operating areas which are simplified, however, with the result that the driver can input the character sequence with a shorter visual check than in the case of the screen keyboard. This development provides for the control apparatus to be set up, for the alternative operating mode, to display a reduced number of operating areas and/or larger-sized operating areas in comparison with keys of the screen keyboard on the display apparatus for the purpose of receiving the character sequence. For example, it is possible to display operating areas which indicate the most likely character sequences, for example at least one navigation destination which has previously been input and/or at least one navigation destination marked as a favorite. The driver then cannot define or stipulate a new navigation destination by inputting individual characters. However, this development has the advantage that an input is still possible in a manner based on operating areas but the driver requires less time for deciding or inputting in this case.

One development completely dispenses with the use of the display apparatus, thus minimizing the distraction of the driver. In this development, the control apparatus is set up to activate voice operation for the alternative operating mode. The driver can therefore input the character sequence by speaking.

One development relates to the configuration of feedback, on the basis of which the driver can check whether he has correctly input the character sequence. The development provides for the control apparatus to be set up to provide input feedback for the alternative operating mode by virtue of a character in the character sequence which has already been captured being displayed on the display apparatus. The driver can therefore keep his gaze on the traffic situation and can then look at the display apparatus when the opportunity arises and is provided with a display of the character which has already been captured or input. If necessary, the driver can therefore leave time to complete the character sequence and can check at any time, when the opportunity arises, whether the character sequence which has previously been input is correct. In addition or as an alternative to displaying the captured character, one development provides for a character which has already been captured to be acoustically announced by using a synthetic voice output. The driver therefore listens to the recognized letters or characters. This is possible completely without a display, thus resulting in the additional advantage that the driver does not need to avert his gaze from the traffic situation in order to check the character sequence.

One development provides for the control apparatus to be set up to change from the operating mode to the alternative operating mode only if a driving speed of the motor vehicle is greater than a predetermined minimum speed. The minimum speed may be 0 km/h or, for example, may also be a value in a range of less than 10 km/h, for example less than or equal to 6 km/h. This development has the advantage that the driver can also use the screen keyboard when permitted by the driving situation.

In this respect, one development relates to the situation in which the driver uses the screen keyboard, for example when the motor vehicle is at a standstill, for example at traffic lights, and then moves off when the character sequence has not yet been completely input and the driving speed hereby exceeds the minimum speed. In this development, the control apparatus is set up to retain a partial character sequence, which has already been input in the operating mode with the screen keyboard, in the event of a change to the alternative operating mode and to continue the further input of the character sequence in the alternative operating mode. This therefore results in a seamless transition when inputting the character sequence without the driver losing the partial character sequence which has already been input only because he has set off with the motor vehicle.

Further developments relate to the matter of when it is intended to change from the alternative operating mode back into the operating mode with the screen keyboard again. According to one development, the control apparatus is set up to deactivate the alternative operating mode again if the sensor apparatus signals an absence of the driver-side object. The deactivation of the alternative operating mode implies the activation of the operating mode with the screen keyboard. As soon as the driver therefore removes the object, for example his hand, from the display apparatus again, a change is made back to the operating mode with the screen keyboard again. This results in the advantage that the screen keyboard is immediately available again. Alternatively, one development provides for the alternative operating mode to be deactivated again only if the sensor apparatus signals a passenger-side approach of an object. The driver can therefore bring an object closer and then remove it again on the driver's side and is still presented with the alternative operating mode in this case. This has the advantage that the driver can also interrupt the input of the character sequence in order to carry out a driving maneuver, for example, which requires both hands on the steering wheel. This does not disrupt the input of the character sequence since the alternative operating mode is retained.

As already stated, also described herein is a motor vehicle having an embodiment of the operating device described herein. In this case, the touch-sensitive display apparatus of the operating device is arranged between a driver's seat and a passenger seat of the motor vehicle. The motor vehicle has the advantage that both the driver and the passenger can operate the operating device using the same display apparatus for displaying a screen keyboard without the driver being unnecessarily distracted by the screen keyboard. The motor vehicle may be in the form of an automobile, for example, a passenger automobile.

Finally, also described herein is a method for receiving a character sequence from a user by using an operating device in a motor vehicle, wherein a control apparatus of the operating device, in an operating mode, displays a screen keyboard for receiving the character sequence on a touch-sensitive display apparatus. A sensor apparatus detects when an object approaches the display apparatus. In this case, a distinction is made between the described driver-side approach and the passenger-side approach. The control apparatus of the operating device deactivates the operating mode if a driver-side approach of the object is detected and instead activates the described alternative operating mode which differs from the operating mode and, for example, is configured without the screen keyboard, that is to say does not have a keyboard.

Also described herein are developments of the method having features which have already been described in connection with the developments of the motor vehicle and operating device described herein. For this reason, the corresponding developments of the method are not described again here.

BRIEF DESCRIPTION OF THE DRAWINGS

These and other aspects and advantages will become more apparent and more readily appreciated from the following example embodiment is described below. In this respect, the single drawing is a schematic illustration of a motor vehicle having the operating device described herein.

DETAILED DESCRIPTION OF THE PREFERRED EMBODIMENT

Reference will now be made in detail to example embodiments with reference to the accompanying drawing, wherein like reference numerals refer to like elements throughout.

In the example embodiments explained below, the described components are each individual features which can be considered independently of one another and which each also develop the disclosure independently of one another and can therefore also be considered to be part of the disclosure individually or in a combination other than that shown. Furthermore, the described embodiments can also be supplemented with further features which have been described.

The single drawing shows a passenger compartment or a vehicle interior 2 of a motor vehicle 1 from the perspective of a driver 3, of whom only a forearm 4, a hand 5 and a finger 6 are illustrated in the single drawing. The motor vehicle 1 may be, for example, an automobile, for example a passenger automobile. A dashboard 7, a steering wheel 8 and a windshield 9 are illustrated.

The motor vehicle 1 may have an operating device 10 which can be used by the driver 3 to operate one or more vehicle components 11. The operating device 10 generates control signals 12 for controlling or setting the vehicle components 11. For this purpose, the operating device 10 has a control apparatus 13 and a touchscreen 14. The touchscreen 14 is a touch-sensitive output apparatus. The control apparatus 13 can be implemented, for example, on the basis of a processor apparatus, for example a microcontroller or microprocessor.

For the further explanation of the example, it is assumed that the operating device 10 controls a navigation apparatus or a navigation system as a vehicle component 11. The driver 3 would like to input a navigation destination as a character sequence, that is to say a city name, for example. In order to input the character sequence, the control apparatus 13 first of all displays a screen keyboard 15 having character keys 16 on the touchscreen 14 in an operating mode B1. For the sake of clarity, only a few of the character keys 16 are provided with a reference symbol in the single drawing. In this situation, it is possible for a passenger (not illustrated), for example, to tap the character keys 16 on the touchscreen 14 in succession and hereby input the navigation destination letter-by-letter as text. The recognized characters which have been indicated can be displayed on the touchscreen 14, for example in an output field 17.

However, the operation of the screen keyboard 15 requires such a high degree of attentiveness that, in the case of the motor vehicle 1, the driver 3 is prevented from being able to use the screen keyboard 15 in the described manner during a journey of the motor vehicle 1.

In order to prevent use, a sensor apparatus 18 is provided in the motor vehicle 1 and detects whether an object, for example the hand 5, approaches the touch screen 14 from a driver's side 19. A sensor signal 21 from the sensor apparatus 19 therefore signals an approach from the driver's side 19. In the case of an approach from an opposite passenger side 20, the sensor apparatus 18 either does not signal anything at all or signals a passenger-side approach. The distinction between a driver-side approach and a passenger-side approach may therefore also involve the sensor signal 21 actually signaling an approach only in the case of a driver-side approach or an indication of the driver side/passenger side direction expressly being signaled.

The sensor apparatus 18 can therefore monitor, for example, a virtual separating plane 22, the penetration of which by the hand 5 of the driver 3 causing the sensor signal 21 containing the driver-side approach to be transmitted to the control apparatus 13. The sensor apparatus 18 may be implemented, for example, on the basis of one or more proximity sensors, for example capacitive proximity sensors, and/or on the basis of one or more infrared sensors. The sensor apparatus 18 may also be implemented on the basis of a camera and an image processing apparatus.

If a driver-side approach of an object, for example the hand 5, is detected, the control apparatus changes over from the operating mode B1 with the screen keyboard 15 to an alternative operating mode B2 which does not have a keyboard, that is to say without the screen keyboard 15. This alternative operating mode B2 is likewise illustrated in the single drawing. For example, provision may be made for an input area 23 for a handwritten input to be provided on the touchscreen 14 for the driver. The driver can use his finger 6 to draw a character trace 24 on the input area 23. A handwriting recognition apparatus 25 of the control apparatus 13 then converts the character trace 24, in a manner known per se, into a recognized character 26 which in turn can be displayed in the output field 17, for example. This makes it possible for the user to check the correct recognition of the character trace 24.

In addition or as an alternative to the handwritten input, provision may be made for the driver 3 to speak a voice command 27 which is represented by sound waves in the single drawing. A sound capture apparatus 28, for example a microphone or an arrangement of a plurality of microphones, can capture the voice command 27 and can make it available to the control apparatus 13 as a voice signal 29. The control apparatus 13 can use a voice recognition apparatus 30 to likewise generate a character sequence from the voice input 27, which character sequence can be used as an input instead of a keyboard input.

Additionally or alternatively, larger and fewer operating keys can also be displayed in the alternative operating mode B2 instead of the character keys 16, which operating keys are provided for the purpose of inputting entire character sequences which are already prefabricated and indicate, for example, predetermined navigation destinations, for example navigation favorites, and/or navigation destinations which have already been previously indicated.

After a character sequence has been input in the alternative operating mode B2, the control apparatus 13 uses the character sequence to generate a corresponding control signal 12 in order to configure the vehicle component 11, that is to say the navigation system, for example.

It therefore becomes possible to provide two operating modes B1, B2 for a text input, namely a screen keyboard and a handwritten input, for example. If the system recognizes that the driver wishes to carry out the input himself during the journey, the operating device 11 automatically changes over to the handwritten input mode, that is to say the alternative operating mode B2. In contrast, if the operating device 11 recognizes that the passenger is operating it, it allows the operating mode B1 and automatically switches to the screen keyboard 15 or makes it possible to use both operating modes B1, B2. A selection switch can then be provided for this purpose on the touchscreen 14, for example, which selection switch allows the passenger to choose between the operating modes B1, B2.

Therefore, there is no safety risk to the driver as a result of distraction while operating the operating device 10 since the distracting screen keyboard 15 is not available to him. In the event of an approach with an object or a hand from the driver's side 19, the touchscreen 14 is blocked for operation, that is to say is switched off for example, or the alternative operating mode B2 is activated, whereas the touchscreen 14 remains enabled as a result of approach of the passenger from the passenger side 20.

If the screen keyboard 15 is displayed on the touchscreen 14 and can be operated, the screen keyboard 15 is hidden during the journey in the event of approach from the driver's side 19. The input field 23 for the handwritten input, for example, is displayed instead. In the event of an approach from the passenger side 20, the screen keyboard 15 is not hidden.

The driver is prevented from being distracted for inputs which are not absolutely necessary or are not allowed during the journey, for example the keyboard input of a location in the navigation system.

The sensor apparatus 18 can determine, for example by using gesture recognition, from where the hand 5 or an object approaches the touchscreen 14 and can accordingly block or enable the touchscreen 14. In connection with gesture operation, the relevant angles of approach with respect to the touchscreen 14 can be determined in this case by use of experiments. Alternatively, sensors which can monitor the described virtual separating plane 22 can be provided.

Overall, the example shows how a keyboard on a touchscreen can be blocked when the driver approaches from the driver's side and can be enabled when the passenger approaches from the passenger side by the operating device described herein.

A description has been provided with reference to example embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. An operating device for a motor vehicle having a driver side and a passenger-side opposite the driver side, the operating device comprising:
    a touch-sensitive display;
    a sensor configured to detect whether an object that approaches the touch-sensitive display is a driver-side approach by the object from the driver side or a passenger-side approach by the object from the passenger side; and
    a controller configured to, in a first operating mode, control the touch-sensitive display to display a screen keyboard to receive an input of a character sequence from a user on the touch-sensitive display, and, when the sensor detects the driver-side approach by the object from the driver side and the motor vehicle moves at a driving speed greater than a predetermined driving speed while in the first operating mode, the controller is further configured:
    to deactivate the first operating mode in which the screen keyboard is displayed on the touch-sensitive display so that the screen keyboard is not available to a driver positioned on the driver side, and to activate a second operating mode which differs from the first operating mode and in which an alternative input to receive the character sequence from the driver positioned on the driver side is provided through an alternative screen keyboard provided on the touch-sensitive display while the motor vehicle moves at the driving speed greater than the predetermined driving speed.

2. The operating device as claimed in claim 1, wherein the second operating mode includes a handwritten input for the driver instead of the screen keyboard, and
    the controller is configured to capture a character trace of the handwritten input on the touch-sensitive display using the touch-sensitive display, and/or to control a camera to capture a hand movement of the handwritten input freely carried out by the driver in space in a contactless manner, as the character trace, and/or to control the camera to capture a finger movement of the handwritten input freely carried out by the driver in space in the contactless manner, as the character trace.

3. The operating device as claimed in claim 1, wherein the controller is configured to, in the second operating mode, control the touch-sensitive display to display a reduced number of operating areas and/or larger-sized operating areas to receive the character sequence through the alternative screen keyboard, in comparison with a number and/or a size of keys of the screen keyboard displayed on the touch-sensitive display in the first operating mode.

4. The operating device as claimed in claim 1, wherein the controller is configured to activate voice recognition to receive the alternative input of at least a portion of the character sequence for the second operating mode.

5. The operating device as claimed in claim 1, wherein the controller is configured to provide input feedback for the second operating mode by controlling the touch-sensitive display to display a character in the character sequence which has been captured and/or by controlling a synthetic voice output to acoustically announce the character.

6. The operating device as claimed in claim 1, wherein the controller is configured to change maintain the first operating mode when the sensor detects the driver-side approach by the object from the driver side while the motor vehicle moves at a driving speed equal to or less than the predetermined driving speed.

7. The operating device as claimed in claim 1, wherein the controller is configured to retain a partial character sequence, which has been input in the first operating mode, in the event of a change from the first operating mode to the second operating mode, and to continue a further input of a remaining portion of the character sequence in the second operating mode.

8. The operating device as claimed in claim 1, wherein the controller is configured to deactivate the second operating mode when the sensor signals to the controller an absence of the driver-side approach by the object from the driver side or when the sensor signals to the controller a passenger-side approach by the object from the passenger side.

9. A motor vehicle, comprising:
a chassis;
a first seat disposed on a driver side of the motor vehicle;
a second seat disposed on a passenger-side of the motor vehicle, opposite the driver side; and
an operating device, including:
a touch-sensitive display disposed between the first seat and the second seat, a sensor configured to detect whether an object that approaches the touch-sensitive display is a driver-side approach by the object from the driver side or a passenger-side approach by the object from the passenger side, and
a controller configured to, in a first operating mode, control the touch-sensitive display to display a screen keyboard to receive an input of a character sequence from a user on the touch-sensitive display, and, when the sensor detects the driver-side approach by the object from the driver side and the motor vehicle moves at a driving speed greater than a predetermined driving speed while in the first operating mode, the controller is further configured:
to deactivate the first operating mode in which the screen keyboard is displayed on the touch-sensitive display so that the screen keyboard is not available to a driver positioned on the driver side, and to activate a second operating mode which differs from the first operating mode and in which an alternative input to receive the character sequence from the driver positioned on the driver side is provided through an alternative screen keyboard provided on the touch-sensitive display while the motor vehicle moves at the driving speed greater than the predetermined driving speed.

10. The motor vehicle as claimed in claim 9, wherein the sensor is configured to transmit a signal to the controller indicating that the object approaches the touch-sensitive display only when the approach is the driver-side approach by the object from the driver side and the operating device is in the first operating mode.

11. The motor vehicle as claimed in claim 10, wherein the controller is configured to, in the first operating mode, continue to operate in the first operating mode when the sensor detects the passenger-side approach by the object from the passenger side.

12. The method as claimed in claim 10, further comprising:
transmitting, via the sensor, a signal to the controller indicating that the object approaches the touch-sensitive display only when the approach is the driver-side approach by the object from the driver side; and
while the first operating mode is activated, maintaining the first operating mode when the sensor detects the passenger-side approach by the object from the passenger side.

13. The motor vehicle as claimed in claim 9, wherein
the alternative screen keyboard includes a touch-sensitive portion of the touch-sensitive display configured to receive a handwritten input by the object from the driver side,
the controller is configured to recognize a character trace of the handwritten input on the touch-sensitive portion of the touch-sensitive display, and
the controller is configured to convert the recognized character trace into a character which is displayed in an output field provided on another portion of the touch-sensitive display.

14. The motor vehicle as claimed in claim 9, wherein
the alternative screen keyboard includes touch-sensitive areas of the touch-sensitive display configured to display predetermined characters for the alternative input to receive the character sequence, and
a number of the touch-sensitive areas of the alternative screen keyboard in the second operating mode are less than a number of touch-sensitive areas configured to display characters for the input of the character sequence in the first operating mode and/or a size of the touch-sensitive areas of the alternative screen keyboard in the second operating mode is greater than a size of touch-sensitive areas configured to display characters for the input of the character sequence in the first operating mode.

15. The motor vehicle as claimed in claim 9, wherein
the alternative screen keyboard includes touch-sensitive areas of the touch-sensitive display configured to display predetermined characters for the alternative input to receive the character sequence, and
the controller determines the predetermined characters to be displayed in the touch-sensitive areas based on at least one of a previously input character sequence or an input character sequence designated as a favorite by a user.

16. The motor vehicle as claimed in claim 9, wherein
the sensor is configured to ignore the passenger-side approach by the object from the passenger side in the first operating mode such that the sensor does not signal to the controller that the passenger-side approach by the object from the passenger side occurs and the first operating mode is maintained, and
the sensor is configured to signal to the controller the passenger-side approach by the object from the passenger side in the second operating mode such that the controller deactivates the second operating mode and activates the first operating mode.

17. A method for receiving a character sequence from a user by an operating device in a motor vehicle, the method comprising:
displaying, in a first operating mode, via a controller of the operating device, a screen keyboard for receiving the character sequence on a touch-sensitive display;
detecting, via a sensor, whether an object that approaches the touch-sensitive display apparatus is a driver-side approach by the object from a driver side of the motor vehicle or a passenger-side approach by the object from a passenger side of the motor vehicle opposite the driver side; and
when the driver-side approach by the object from the driver side is detected and the motor vehicle moves at a driving speed greater than a predetermined driving speed while in the first operating mode, deactivating, via the controller, the first operating mode in which the screen keyboard is displayed on the touch-sensitive display so that the screen keyboard is not available to a driver positioned on the driver side, and activating a second operating mode which differs from the first operating mode and in which an alternative input for receiving the character sequence from the driver positioned on the driver side is provided through an alternative screen keyboard provided on the touch-sensitive display while the motor vehicle moves at the driving speed greater than the predetermined driving speed.

18. The method as claimed in claim 17, further comprising:
- displaying, in the second operating mode, the alternative screen keyboard which includes a touch-sensitive region of the touch-sensitive display to receive a handwritten input by the object from the driver side;
- receiving the handwritten input by the object from the driver side on the touch-sensitive region of the touch-sensitive display;
- recognizing, via the controller, a character trace of the handwritten input;
- converting, via the controller, the recognized character trace into a recognized character; and
- displaying the recognized character in an output field provided on another region of the touch-sensitive display.

19. The method as claimed in claim 17, further comprising:
- displaying, in the second operating mode, the alternative screen keyboard which includes touch-sensitive areas of the touch-sensitive display to display predetermined characters for the alternative input to receive the character sequence, and
- wherein a number of the touch-sensitive areas of the alternative screen keyboard in the second operating mode are less than a number of touch-sensitive areas configured to display characters for the input of the character sequence in the first operating mode and/or a size of the touch-sensitive areas of the alternative screen keyboard in the second operating mode is greater than a size of touch-sensitive areas configured to display characters for the input of the character sequence in the first operating mode.

20. The method as claimed in claim 17, further comprising:
- displaying, in the second operating mode, the alternative screen keyboard which includes touch-sensitive areas of the touch-sensitive display to display predetermined characters for the alternative input to receive the character sequence, and
- determining, by the controller, the predetermined characters to be displayed in the touch-sensitive areas based on at least one of a previously input character sequence or an input character sequence designated as a favorite by a user.

* * * * *

UNITED STATES PATENT AND TRADEMARK OFFICE
CERTIFICATE OF CORRECTION

PATENT NO. : 10,474,357 B2
APPLICATION NO. : 15/769284
DATED : November 12, 2019
INVENTOR(S) : Tahar Bouaziz Page 1 of 1

It is certified that error appears in the above-identified patent and that said Letters Patent is hereby corrected as shown below:

In the Claims

Column 8, Line 63, In Claim 6, before "maintain" delete "change".

Column 9, Line 58, In Claim 12, delete "10" and insert -- 7 --, therefor.

Signed and Sealed this
Twenty-sixth Day of May, 2020

Andrei Iancu
*Director of the United States Patent and Trademark Office*